United States Patent

[11] 3,582,201

[72] Inventor Jerome H. Lemelson
85 Rector St., Metuchen, N.J. 08840
[21] Appl. No. 14,751
[22] Filed Feb. 24, 1970
[45] Patented June 1, 1971
Continuation of application Ser. No. 625,254, Mar. 22, 1967, now abandoned, which is a continuation-in-part of application Ser. No. 518,685, Jan. 4, 1966, now abandoned.

[54] AUDIOVISUAL RECORD MEMBER AND PLAYBACK MEANS THEREFORE
6 Claims, 10 Drawing Figs.

[52] U.S. Cl. .......... 353/16
[51] Int. Cl. .......... G03b 31/06
[50] Field of Search .......... 352/17, 31; 178/7.2, 66 CR; 179/100.3; 353/16, 17

[56] References Cited

UNITED STATES PATENTS 2,683,390 7/1954 Steele .......... 353/16
2,575,203 11/1951 Wolfner II .......... 352/17

*Primary Examiner*—Robert L. Griffin
*Assistant Examiner*—Donald E. Stout

ABSTRACT: This invention relates to an audiovisual record playback system employing a record disc having storage means for both audio and visual information. In one form of the invention, projectable images are stored in a tandem circular or spiral array on a first record disc member which is concentric to and rotatable on a second record disc member assembled with the first disc member and containing audio recordings in a spiral groove thereof. Accordingly, conventional tone arm means may be provided for transducing the audio recordings from the spiral groove of the second record disc member while a modified positioning and projection system is employed to selectively provide images of selected frames on the first disc member.

Other forms of the invention include modifications to the structure of the disc member, the video or projection scanning system and the means for driving the disc member containing visual information or image frames. The apparatus may be operative to project a series of still images in synchronization with audio descriptions thereof or a series of motion-picture images together with associated sound reproductions.

INVENTOR.
JEROME H. LEMELSON

INVENTOR.
JEROME H. LEMELSON

INVENTOR.
JEROME H. LEMELSON

AUDIOVISUAL RECORD MEMBER AND PLAYBACK MEANS THEREFORE

CROSS-REFERENCES TO RELATED APPLICATIONS

This application is a continuation of application Ser. No. 625,254, now abandoned, filed Mar. 22, 1967. Application Ser. No. 625,254 is a continuation-in-part of copending application Ser. No. 518,685, now abandoned filed Jan. 4, 1966, having as a parent application Ser. No. 123,327 filed Mar. 20, 1961, now U.S. Pat. No. 3,239,602.

SUMMARY OF THE INVENTION

The instant invention relates to playback and projection systems, and more particularly to a novel means for storing sound and video information upon a disc, and apparatus for projecting and playing back said information.

Numerous systems presently exist in the art for playing back and displaying sound and video information, respectively. For example, in the motion picture projector field, it is conventional to provide a filmstrip having a multiplicity of image frames which are displayed at a predetermined number of frames per second with the retentivity of the human eye causing the changing image frames to convey smooth continuous movement of the subject matter contained within each image frame. A separate elongated sound tract positioned adjacent the image frames cooperates with suitable playback means for producing the sound in the form of speech, music or other suitable sounds, which material is associated with the subject matter of the image frames being displayed. Such motion picture projection systems, however, are costly and rather tedious from the loading and unloading viewpoint. For example, the film strip is normally wound about a supply roll which is mounted upon a suitable spindle, whereupon the forward end of the film strip is threaded through a circuitous path including drive sprockets, a capstan, a light projection station, a playback capstan and recording head and a takeup reel.

Video tape systems are similarly arranged and also require a tedious loading and unloading procedure.

The instant invention is characterized by providing both sound and video information upon a single disc assembly which may be simply and readily positioned upon a rotatable turntable for playback and display purposes. Display and playback may be initiated immediately after positioning of a tone arm so that its cartridge stylus rides within the record sound groove for the purpose of playing back the sound stored therein, as well as for the purpose of guiding the tone arm having suitable optical scanning means, to follow image information stored in a spiral arrangement in the disc so as to be suitably projected upon a display screen.

It is, therefore, one object of the instant invention to provide a novel unitary disc assembly for storing both sound and video information.

Still another object of the instant invention is to provide novel apparatus for projecting and playing back image and sound information, respectively, stored within a novel unitary disc assembly.

These and other objects of the instant invention will be apparent when reading the accompanying description and drawings in which.

Figure 2:
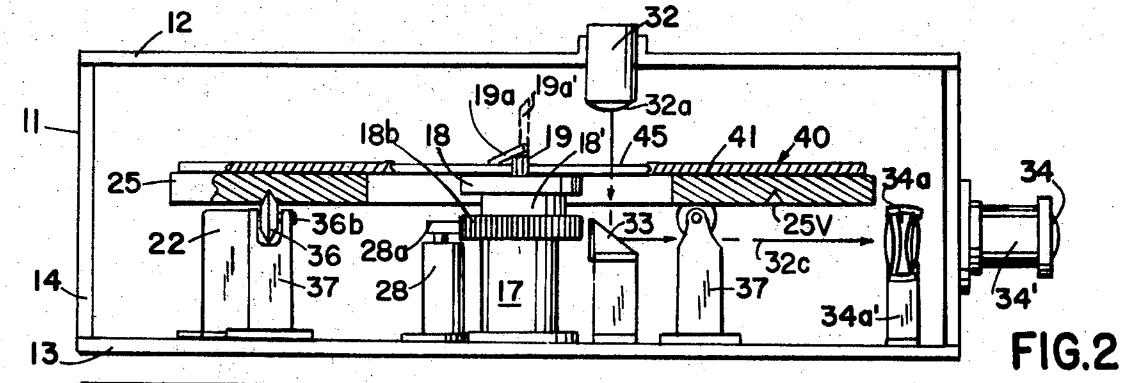
FIG. 2 is a sectional elevational view showing a portion of the display-playback means of FIG. 1.
Figure 2:
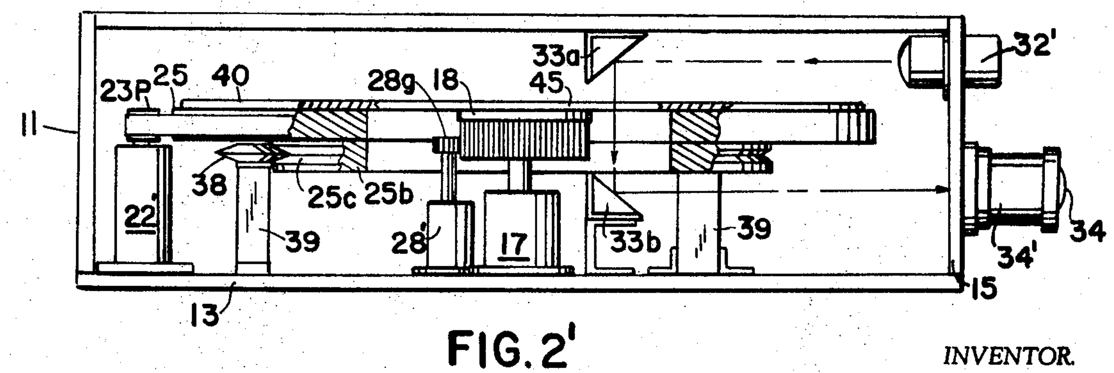

FIG. 2' shows a different embodiment for intermittently rotating the inner turntable than the one shown in FIG. 2.

Figure 1:
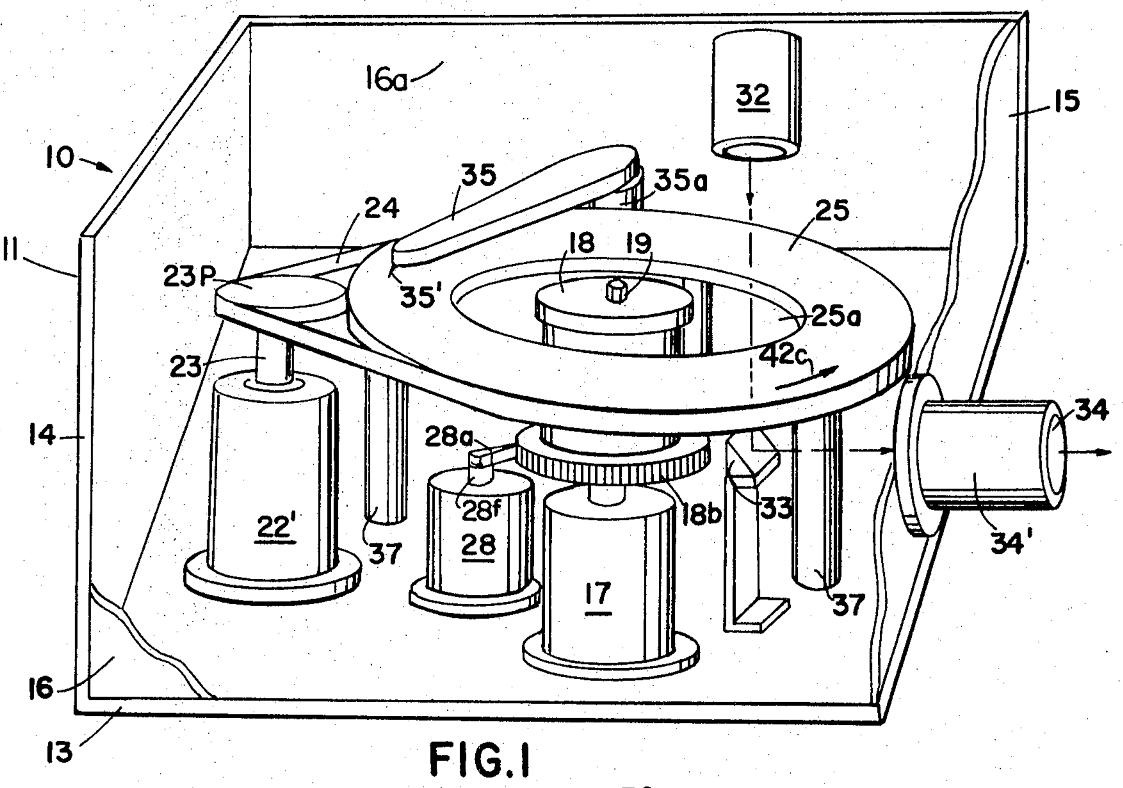
FIG. 1 is a perspective view of a combined display and playback means designed in accordance with the principles of the instant invention.
Figure 3:
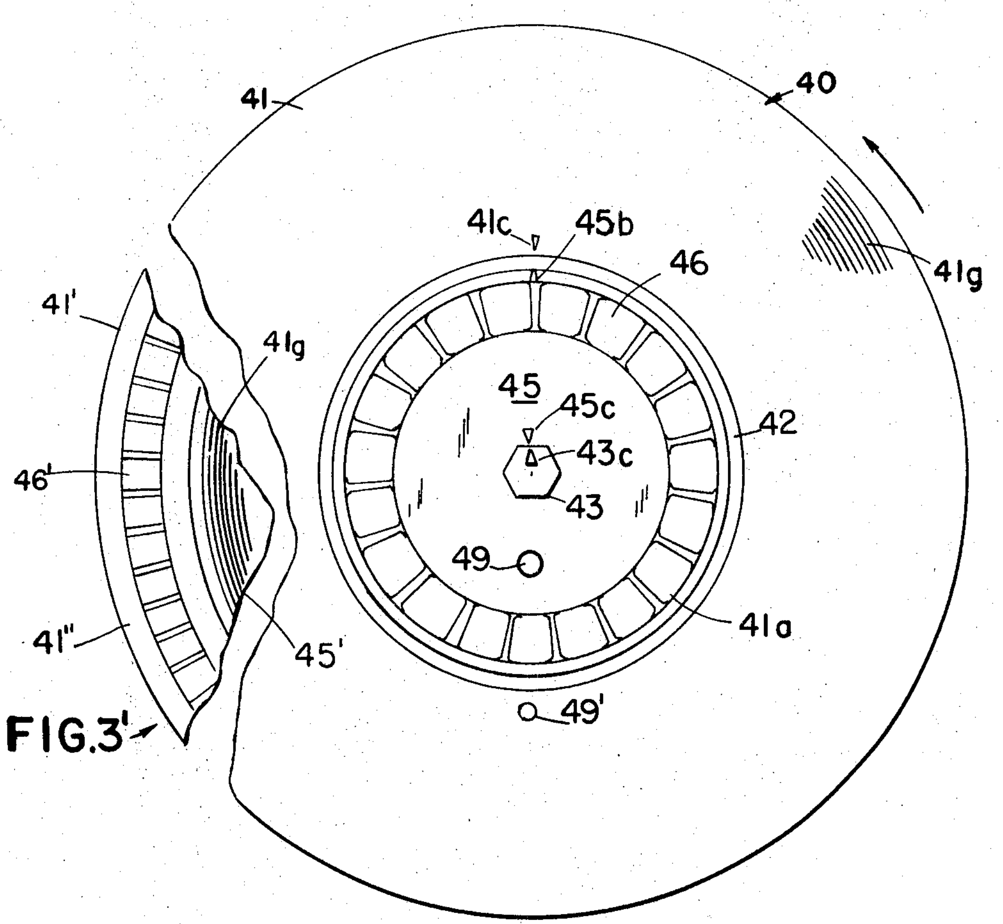

FIG. 3 is a plan view of a record member for storing audio and visual information and which is designed for use with the display and playback means of FIGS. 1 and 2.

FIG. 3' shows an embodiment with the image frames displaced on the outside disc and the audio information on the inside disc.

FIG. *3a'* is a schematic block diagram of the electronics employed for the purpose of operating the rotary stepping solenoid shown in FIG. 1.

FIGS. *3a*, *3b* and *3c* are end cross-sectional views of different structures of disc records of the type shown in FIG. 3.

FIG. 4 shows an alternative embodiment for the storage means of FIG. 3.

Referring now to the drawings, and more particularly to FIGS. 1 through 3, there is shown therein one preferred storage means and playback-display means, which devices have been designed in accordance with the principles of the instant invention. FIGS. 1 and 2 show an apparatus used for displaying and playing back visual and audio information contained in the storage means 40 shown best in FIGS. 3 and 2 (which shows a cross-sectional view of the embodiment of FIG. 3). In the form of record numbers shown in FIGS. 3 and *3a*. In the form of record member shown in FIGS. 3 and *3a* the storage means 40 is a substantially disc-shaped member having an outer portion 41 containing a spiral record groove *41g* in which audio information is placed in the typical fashion. It is well understood that the audio information may be music, speech, or other sound and any combination thereof.

The audio storage section (i.e., the outer disc member) 41 is provided with a concentric opening *41a*. The inner periphery 42 of disc 41 surrounding opening *41a* is formed so as to provide a substantially V-shaped groove *41b* completely surrounding its inner periphery. Groove *41b* acts to position and support an inner record disc member 45 having a substantially circular-shaped periphery and being provided with a plurality of image frames 46 arranged in a circular array in close proximity to the outer periphery of inner record disc 45. The marginal portion of the outer periphery of disc 45 has a substantially arrow-shaped or V-shaped configuration 42 so as to be slidably received within the substantially V-shaped groove 42 of outer disc 41. Thus, it can be seen that the V-shaped groove 42 acts simply to retain inner disc 45 in a substantially coplanar relationship with outer disc 41, while, at the same time, allowing discs 41 and 45 to rotate independently of one another. Inner disc 45 is provided with a hexagonal-shaped opening 43 so as to be keyed to a spindle (which will be more fully described) for the rotation of disc 45. While a hexagonal-shaped opening is shown, it should be understood that any other polygonal-shaped opening such as a square, pentagon, octagon, etc., may be employed, As it is preferred to provide speech or other audio recordings which describe or relate to the subject matter of the image frames 46, means are provided for keying the starting image frame with the sound recordings in the spiral grooves *41g* of the outer record disc 41. Arrowheads or marks *41c* and *45b* are printed or impressed on discs 41 and 45 to be visually or automatically aligned prior to playback. An arrowhead *45c* is also shown impressed in inner disc 45 to be keyed to a mark *43c* stamped in the end of shaft 19 which shaft extends upwardly from an inner turntable 18 which supports the inner disc and will be more fully described.

The playback-display apparatus 10, shown in FIGS. 1–2, comprises a housing 11 having top and bottom walls 12, 13, rear and frontwalls 14 and 15 and sidewalls 16 and *16a* portions of which walls are removed or broken away for clarity. The operating components of apparatus 10 constitute an inner turntable 18 having an upper surface designed to support the inner disc 45 and a separately rotatable outer turntable 25. The inner turntable 18 is mounted to shaft 19 of a bistable solenoid 17. The end of shaft 19 is shown hexagonally shaped so as to permit the similarly shaped opening 43 in the inner disc 45 to key the inner disc thereto for rotation with the inner turntable 18.

FIGS. 2 and 2' show different means for intermittently rotating the inner turntable to selectively position different image frames in the scanning field of the optical projection system. In FIG. 2 a pulse-activated monostable rotary solenoid 28 has a finger *28a* secured to the end of its output shaft which operates in the manner of a ratchet and pawl in engaging the teeth of a toothed wheel or gear 18*b* which is secured to the lower end of an extension 18' of the turntable 18. The bistable solenoid 17 is operative to raise and lower turntable 18 to permit retraction of the end 19*a* of shaft 19 below the level of the disc record member 40 permitting such records to be slidably advanced across the turntable without interference with the shaft during automatic record-changing operation. In FIG. 2' a pulse operated rotary stepping motor 28' has a pinion gear 28*g* connected to its shaft which engages the teeth of circular gear 18' secured below the turntable 18.

FIGS. 2 and 2' also show modified means for supporting and rotating the outer turntable 25 which is an annular disclike member having an inner opening 25*a* providing clearance for the inner turntable 18 and serves to support and rotate the outer disc portion 41 of the storage device 40. In FIG. 2, a V-shaped groove 25V is provided as a circular track in the undersurface of the disc-shaped outer turntable 25. The surfaces of the groove 25V ride against a plurality of V-shaped wheels 36 which are rotatably supported and equispaced around and below the turntable 25. The turntable 25 may be power rotated by frictional or toothed engagement of the peripheral surfaces of the wheels and the surfaces of the groove 25V. Notation 22 refers to a constant speed motor secured to the mount 37 which rotatably supports one of the wheels 36, the output shaft of which motor is connected to rotate said wheel for rotating turntable 25. In FIG. 2' the turntable 25 is provided with a downwardly directed shoulder 25*b* having a V-shaped groove 25*c* provided around its periphery. Rotatably mated in said groove are three or more V-shaped rollers 38 which are supported for rotation about vertical axes on respective mounts 39 secured to the bottom wall 13 and equispaced about the turntable. Rotation of the outer turntable 25 in FIGS. 1 and 2' is effected by a constant speed motor 22' which mounts a pulley 23P on its output shaft which drives a flexible belt 24 encircling the outer periphery of turntable 25 for frictionally rotating same as the motor operates.

Reproduction of the audio recordings from the groove of the outer record disc 41 is effected by a pickup tone arm 35 which may be of conventional design having a needle 35' riding in the record groove and pivotally supported on a suitable mount 35*a* secured to housing 11 and manually or automatically positioned with respect to the record disc by conventional record playback means.

FIGS. 2 and 2' also illustrate different forms of the projection system for the images recorded on the inner disc 45. In FIG. 2, projection light from a suitable source is emitted from a housing 32 secured to wall 12 and containing a condensing lens system 32*a* for focusing light therefrom upon the image frame of the array of frames on said inner disc member 45 which is aligned with the axis of said lens system. Whereas in FIG. 2 the light source housing 32 is disposed against and supported by the top wall 12 of the housing 11 to direct the properly focused light normal to the surface of the image frame aligned therewith, in FIG. 2' the light source housing 32' is supported by the sidewall 15 of the playback and projector housing 11 and is adapted to direct light parallel to the face of the record disc 40 against a first mirror or prism 33*a* supported by the top wall 12 of housing 11 and positioned in alignment with the described circular array of image frames 46 so as to direct light from said light source in housing 32' perpendicularly to and through the image frames. A second mirror or prism 33*b* is positioned beneath the turntables on a mount supported by the bottom wall 13 of the housing 11 and is adapted to direct the light modulated in passing through the image frame parallel to the bottom surface of the turntable 25 to a projection lens system 34 mounted in a housing 34' supported by the sidewall 15.

Projection light may comprise a source of suitable incandescent light or a laser located in the described housings and operative to direct an intense projection light beam directly through the image frames or filmstrip located on the inner disc 45 and/or against suitable optical components disposed adjacent the annular spacing 25*a* between the turntables 18 and 25. The light source housing and projection lens system housing may also be provided in direct alignment with each other. In other words, the described mirrors and/or prisms may be eliminated from the illustrated optical systems by disposing the projection lens system 34 against the bottom wall 13 in direct alignment with the light source housing mounted to the top wall 12 for projecting image light perpendicular to said wall. Turning again to FIG. 2, the light rays are directed downwardly, as shown by arrow 32*b*, so as to pass through the image frame to be displayed and to impinge upon a prism 33 positioned beneath inner disc 45 and in the region between inner turntable 18 and outer turntable 25.

Prism 33 causes the light rays to be deflected and to move in the horizontal direction, as shown by arrow 32*c*, so as to pass through and be focused by projection lens system 34 and subsequently to be displayed upon a suitable projection screen (not shown). An additional condensing lens system 34*a* may be provided in the region between prism 33 and projection lens 34. In FIG. 2 the hexagonal shaft 19 is provided with a pivotally mounted arm 19*a* which may be rotated from the dotted position 19*a'* to the solid line position 19*a* so as to rigidly hold inner disc 45 against the upper surface 18*a* of turntable 18 upon operation of solenoid 17. The operation of the embodiment of FIGS. 1 through 3 is as follows:

The disc assembly 40 is positioned upon the inner turntable with the toggle arm 19*a* in the dotted line position 19*a'*. The disc 45*a* is positioned upon shaft 19 so that its locating arrowhead 45*c* is in alignment with a similar arrowhead 19*b* provided on the surface of the hexagonal-shaped shaft 19. By cooperatively aligning the elements 19 and 45, this insures that the first image frame of the image frame series to be projected will be positioned within the projection field of the projection system.

The disc assembly 40, which may be "cut" so as to contain all descriptions of the subject matter being displayed by means of the projection system, will then begin to describe subject matter being so displayed. It should be understood that the amount of descriptive material relative to each image frame to be projected may be variable and the descriptive material for each image frame may be selected dependent only upon the needs of the user.

Considering FIG. 3 for the moment, let it be assumed that the tone arm started at position 42*h* of the spiral record groove 42 and that the oral material has now been played relating to the image frame being projected, for example, image frame 46', so that the needle of the tone arm is now in position 42*b*.

Figures 3A, 3B:
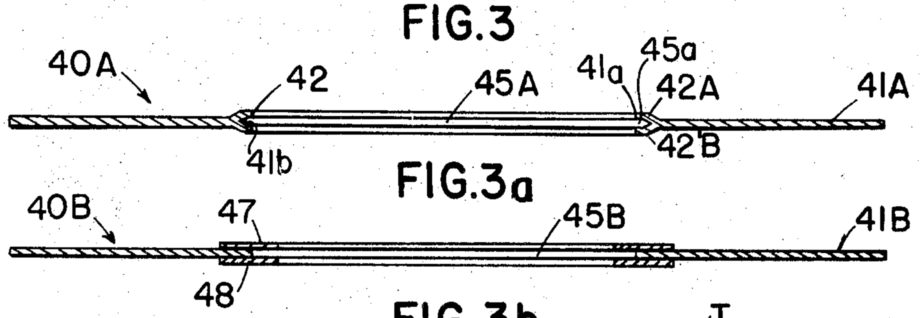
Figure 3C:
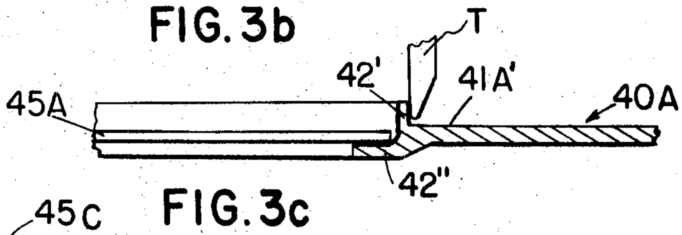
Figure 3D:
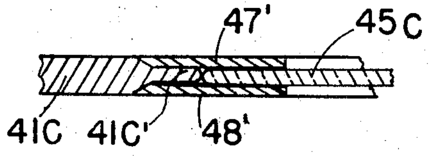
Figure 3A:
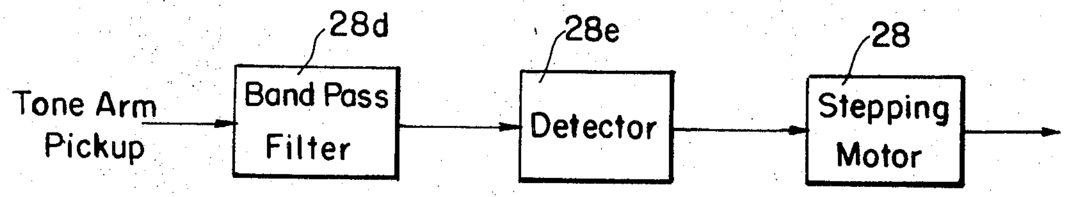

Let it further be assumed that the disc assembly 40 is rotating in the direction shown by arrow 42*c*. The needle will thus pass over the section 42*d* of the spiral record groove which is preferably a short section having a substantially high frequency tone recorded therein. This tone might be of the order of 17,500 cycles per second, for example, which tone is of a sufficiently high frequency so as not to be normally discernible by the average listener, while, at the same time, providing a suitable signal for operating stepping relay 28. As shown in FIG. 3*a'*, for example, the output signal from the tone arm is impressed upon a band-pass filter which may, for example, be tuned to pass a signal of 17,500 cycles per second. When this signal is received, the band-pass filter impresses its output upon a detector circuit 28*e* which provides a DC output signal of sufficient magnitude and duration for operating stepping relay 28 so as to cause its mechanical output 28*f* (i.e., its armature) to advance inner disc 45 by an amount sufficient to position the next image frame within the projection system for display thereof. Whereas it may be true that the speech or other sounds recorded within the spiral record groove 42 may generate harmonics which will lie in the range of 17,500 cycles per second, it should be understood that these tones will be quite transient in nature, and thereby insufficient to develop a signal of suitable magnitude and duration at the output of detector 28*e* for operating relay 28. Such high frequency signal sections as the sections 42*d* will be positioned immediately after each descriptive sound portion related to an image frame has terminated so that the inner turntable may be stepped to project the next image frame to be orally described.

Suction means may be employed to hold the inner disc 45 of FIG. 3, as may an offset key or pin means projecting upwardly from the center turntable be operative to cooperate with a center pin means in retaining a disc with a circular opening or round hole at its center provided that auxiliary means, such as the illustrated offset hole 49 is provided in the disc 45 to permit it to be gripped and rotated on turntable 18 without slipping. The outer annular disc 41 containing the audio recording 41*g* also is provided with a small hole 49' therethrough suitably located near the inner periphery thereof to be engaged by a pin projecting outwardly from an outer turntable (to be described) which supports and rotates said outer disc.

The record disc assembly 40 of FIG. 3 may be modified as to the illustrated relative diameters of the inner and outer disc members. It is also noted that the image frames 46 may be disposed on or in the outer disc member as illustrated in FIG. 3' while the spiral record groove is provided on the inner disc member 45' which is rotated at constant speed while the outer disc, which is denoted 41' in FIG. 3, is rotationally stepped to bring selected image frames into the properly placed scanning field of an optical projection system by rotating means such as described applied to the respective turntables. In other words, the intermittent driving means 28 would be applied to rotate the outer turntable 25 while a constant speed motor is operative to drive the inner turntable 18.

Further structural details of several embodiments of a record disc of the type shown in FIG. 3 are illustrated in FIGS. *3a* to *3d*. Disc 40A of FIG. *3a* comprises an annular record-bearing plate or sheetlike portion 41A, the inside periphery of which is formed with a circular channel or V-shaped groove 42 defined by a pair of circular liplike formations 42A and 42B each extending outwardly from a respective side of the disc which define a track or guide for the inner disc member 45A which may rotate freely therein. Formations 42A and 42B may be welded to the annular disc 41A or molded integral therewith with either or both formations 42A and 42B of such a shape and dimension as to permit the peripheral edge portion inner disc member 45A to be "snapped" into the circular groove 42 by deflecting one of said formations or to be assembled therewith by means described hereafter.

Whereas in FIG. *3a* the inner disc 45 containing the array 41*a* of image frames shown in FIG. 3 may be rotated or held while the outer disc 41 rotates differently therefrom by virtue of its sliding engagement in the V-shaped groove formation 42 formed at the inner edge of the outer disc, in FIG. *3b*, a pair of annular circular washerlike members 47 and 48 are disposed so as to overlap the inner marginal portion of the outer disc 41B of the modified embodiment to provide a U-shaped channellike retaining means for the inner disc 45B the peripheral marginal portion of which is retained within said channel in a manner to permit relative rotation of the two disc members. The abutting surfaces of members 47 and 48 may be bonded, welded or otherwise secured to the respective top and bottom surfaces of the outer disc 41B preferably after disposing the inner disc member therebetween. In the embodiments of FIGS. *3a* and *3b* both the circular lip formations 42A and 42B of the V-shaped groove formation 42 and the annular members 47, 48 may be made of a flexible plastic material such as polyvinyl chloride, polyethylene, polypropylene or other suitable polymer and so dimensioned as to permit the deflection of at least one of the lip formations or one of the circular formations in a manner to permit the respective inner disc members to be disposed within the channel or groove defined thereby without deformation of the formation beyond its elastic limit so that, in effect, the inner disc may be "snapped" into place and will be rotatable with respect to the outer disc as well as being assembled therewith as described. For example, in the embodiment illustrated in FIG. *3a* is the lip formations 42A and 42B define conically formed shapes and are properly angled, one of said formations may be suitably deflected outwardly to permit the inner disc 45 to be inserted into the V-shaped groove.

In FIG. *3c* is shown one means for forming the assembly 40 of FIG. 3. This disc member 41A is provided with a first cylindrically shaped lip 42' extending upwardly from one surface thereof around the inner edges of disc 41A and an extension 42'' of the disc 41*a* against the outer periphery of the inner disc 45A is rested. Thereafter, a turning tool *T*, preferably heated, is brought to bear against the outer surface of lip 42' while either the tool or the disc rotates or in a compression stroke so as to turn cylindrical formation 42' inwardly to provide a channel as in FIG. 3 for rotationally supporting the inner disc 45A therein as described.

In FIG. *3d* the outer disc 40C has an inner peripheral edge portion 41C' of reduced thickness which supports and is frictionally or weldably assembled with washers 47' and 48' which form a channel therewith for retaining the inner disc 45 as described.

It is noted that the described inner disc members 45, 45A, 45B and 45C of FIGS. 3 to *3d* may be other than circular in peripheral shape as illustrated in the drawings. For example, substantially multipoint contact of the inner recording member with the circular groove of the outer disc member 41 may be derived to reduce friction and wear if the inner recording member is smaller in diameter than the groove and is provided with a plurality of spiderlike protrusions or spokes riding in said groove rather than the periphery of the disc. The disc 45 may also be rectangular or triangular in shape with the corners thereof engaged in the groove of the outer disc.

Whereas the electrical system, i.e., the power supply for energizing the projection system light source, the turntable operating solenoid 28 and the motor 22, is not shown, it should be obvious that any suitable power supply means may be provided and these components have been omitted only for purposes of simplifying the description of the instant invention. Likewise, it should be understood that the tone arm may be provided with a conventional audio amplifier and output speaker for the purpose of converting the vibrations of the tone arm cartridge (not shown) controlled by the recorded record groove into speaker vibrations and ultimately found in speech, music, or any other suitable form.

It can clearly be seen from the foregoing description and drawings that the instant invention provides a novel storage means and playback-display means wherein both sound and video information may be stored within a single disc assembly and played back and displayed through the use of rather simple apparatus which is less complex in both design and use as compared with conventional systems which require more tedious loading and unloading operations. For example, conventional video tape requires the loading of a reel and the feeding of the forward strip of the tape through a capstan and recording head where it is eventually wound upon a takeup reel. A similar operation in reverse order occurs when the video tape is unloaded from the playback mechanism. Motion picture projection systems employing filmstrip also require a complex threading system and the filmstrip is subject to breakage and rapid wear in the act of being driven through a plurality of sprocket wheels. The disc-shaped recording member of the instant invention is relatively simple to load for playback in that the disc need only be placed upon the turntable assembly and the tone arm positioned with its cartridge stylus within the sound recording record groove, which operation is simple and straightforward. In this connection, it is noted that the audio visual apparatus defined herein and illustrated in the accompanying drawings may be subject to a number of design variations to improve or simplify its operation, viz:

I. Automatic record-changing means may be provided to permit the selective or sequential changing or disc record members on the cooperating turntables from a stack or otherwise stored array of said records. Such record-changing means may be provided in the same cabinet as the record-playing means and may be constructed in accordance with conventional record-changing apparatus modified so as to predeterminately locate the record disc during its storage and transfer so that the starting frame of the plurality of said frames of images to be selectively projected is predeterminately located when the record is loaded for playback. In an alternative arrangement for keying or synchronizing reproduction of the audio and the video or projectable recordings, a locating mark, recording or cutout on the disc member containing the image frames or video information may be provided to effect such synchronization by automatically operating the turntable or drive means for the image disc to rotate same when the disc is first positioned thereon immediately after loading until said mark is scanned by limit switch means such as a photoelectric cell. The resulting signal derived from scanning said mark may be applied to activate the stop control of the motor or stepping solenoid bring the turntable with the starting image frame in the scanning field of the projection light beam.

II. Conventional automatically operative means may be provided for retracting the tone arm 35 when a complete playing cycle has been completed in response to mechanical means operative when the tone arm reaches or approaches the innermost location of the spiral record groove or to scanning means scanning either of the two discs, and generating control signals when recordings thereon are scanned which indicate end of recording. Manually operative pushbutton switch control means may also be provided accessible to the exterior of the cabinet for retracting the tone arm to permit removal of the record disc prior to completion of complete playback. Control means in the form of a properly positioned limit switch having an actuator arm or a photoelectric scanner may also be provided to activate the motor means driving the tone arm into operative relationship with the record disc when a record disc is properly inserted into the housing. A slotted opening in a wall of the housing or cabinet and suitable guide means for the record disc may also be provided to permit the rapid insertion and removal of record discs.

III. Suitable cooling means, if necessary to dissipate the heat generated by the light source, such as one or more blowers may be provided in the housing for the described apparatus.

IV. Variations in the drive means for the two record discs assembled with each other are noted as follows. The outer record disc member 41 may be supported between one or more pairs of rotatable wheels compressively engaging same between the upper and lower surfaces thereof with at least one wheel being power driven and frictionally engaging the surface of the disc in a manner to cause its rotation as described. A single or plurality of pairs of such wheels may replace the outer turntable 25 of FIGS. 1 and 2 or may cooperate therewith in supporting and driving the disc.

V. Various modifications to the means for holding the inner disc on the inner turntable 18 while the outer disc rotates may be effected. For example, the disc-engaging means 19 of FIG. 2 may be modified and may include suction means associated with the turntable or a solenoid mounted to the top wall 12 of the housing and operative to project its shaft to engage the upper surface of the inner disc. The same device may also be employed to selectively rotate the disc as described.

The clamping means for the inner disc may be eliminated if the shaft of the turntable is properly keyed or a hex shaft 19 is employed together with means for preventing rotation of the turntable, and the disc held by said shaft, during rotation of the outer disc.

VI. A monitoring screen for the projected images may be provided as part of or secured to the housing for the described audiovisual apparatus and operative to receive light modulated in passing through the images provided on the visual record disc member.

VII. Variations in the structure of the record disc are noted as follows:

a. If the circular array of image frames employed for still picture projection are provided on the outer disc member 41 as illustrated in FIG. 3; said outer disc member preferably overhangs the turntable driving same or is supported by the inner disc member and at least one pair of drive wheels engaging opposite faces of the border portion 41'' of the outer disc so as to permit light to be projected through the image frames 46' without interference.

b. The spiral audio-recording groove 41*g* may be replaced by a spiral magnetic recording track on a flat surface of the disc or magnetic recording material disposed in a smooth spiral groove.

VIII. The outer turntables 25 of FIGS. 2 and 2' may be otherwise supported for rotation as described which may include a cylindrical wall or plurality of supports attached thereto and supported for rotation of the turntable by means of a circular track secured to the bottom wall 13 on which track wheels or roll bearings attached to said supports, ride to effect said rotation.

Although this invention has been described with respect to a number of its preferred embodiments, it should be understood that other variations and modifications may be resorted to which fall within the scope of the invention as claimed.

FIGS. 9—12 show modified forms of the invention which utilize a magnetic tape containing audio recordings which replaces the aforedescribed spiral groove record disc. The two embodiments illustrated, however, employ an indexable record disc containing a circular array of image frames for the projectable visual information. In FIGS. 9 and 10, an audiovisual record unit 100 includes a housing 101 having sidewalls 102,102', end walls 104,105 and top and bottom walls 106,107 of substantially rectangular parallelepiped configuration with modifications thereto to accommodate an endless magnetic tape to be driven past an opening 104*b* in wall 104 into which is inserted a magnetic pickup head or heads as operatively provided, for example, in various commercially available magnetic tape cartridges such as the Lear Jet Pak 8 and automatic playback means therefore. Notation C refers to a capstan wheel supported in bearing by the sidewalls of the housing 101 which cooperates with a drive wheel brought thereagainst through an opening 104' in the end wall 104 in driving the tape T through its endless path in the housing. A depression or cavity 102C in the sidewall 102 is circular in shape and has a bottom 108. A headed pin or shaft 114 extending through wall 108 rotationally supports a record disc 110 containing a plurality of image frames 41D arranged in a circular array and operative by rotation of the disc 110 to be brought into alignment with the scanning axis or field of an optical projection system when the composite record unit 100 is inserted, for example, into a playback machine which includes means for guiding said unit to an operative position at which automatic operative means engages and drive the tape in cooperation with wheel C and transduces signals therefrom while further light-projecting means 116 such as described, projects light through an opening 108 in wall 108 and through the image frame 41D' aligned therewith. Thereafter, the light modulated by the stationary image frame is passed through suitable optical means to project same onto a viewing screen.

Disposed at the center of the disc 110 is a hub 111 having an upstanding post 112 with a keyed opening or cavity 113 therein into which the shank 118 or shaft end of a stepping motor or solenoid 117 or other suitable intermittent drive mechanism for the disc is inserted, preferably in an automatic manner after the cartridge 100 is fully inserted into a playback and projection unit. The record disc is then stepped to bring different image frames into alignment with the opening 109 in accordance with stepping signals reproduced from the tape in the manner that the image bearing disc members heretofore described were stepped. It is noted that the end of post 112 lies below the surface of the wall 102 to protect same and prevent its interfering with the guide surfaces of the playback unit into which the cartridge is inserted. To assure that the disc 110 will not rotate during handling or storage thereof a plurality of shallow cavities or dimples D are provided in the undersurface thereof into which a spring-loaded pin P rides and retains the disc at each location in its rotation as rotated by the drive means 117 therefore. Such cavities D are provided inwardly of each image frame and frictionally retain the disc with an image frame in projectable relationship so that the disc will not rotate freely but only when the mechanized drive 117 overcomes the friction of the pin P. Numbers 110N printed or embossed on the surface of the disc indicate the number of each frame so that if the disc should become unsynchronized with the recordings on the tape, printed numbers on the tape may be used to indicate the tape location and the disc may be rotated by inserting a tool into the keyed hole 113 until a number similar to that on the exposed portion of the tape (at 104′) become aligned with the projecting frame position (i.e. the position of frame 41D′.

FIGS. 11 and 12 illustrate a modified form of the composite audio-video record assembly of FIGS. 9 and 10 which includes an assembly 120 of a continuously operative magnetic tape cartridge such as the commercially available Lear Jet Pak having an endless magnetic tape T winding from the center of a coil formation of said tape and drivable past an opening 124*b* in an end wall 124 thereof into which opening magnetic pickup transducers are disposed for playback of the recordings on the tape when properly inserted into a record player unit. A flat record disc 126 is rotatable mounted against the sidewall 122 of the housing 121 for the tape by means of a headed pin 129 extending from a post or hub 127 which protrudes from the other face of the disc 126. The hub 127 contains a hex-shaped cavity 128 with a key channel 129 for receiving a properly shaped shaft of a drive unit as described for rotatably indexing said record disc 126 to bring various frames 41E of a plurality of said frames arranged in a circular track into operative position in the scanning field of a projection system. The disc 126 is mounted so as to overhang the end wall 125 of the housing 121 and the image frame 41E′ immediately to the left of the hub 127, just clears the housing so that projection light may be passed through said frame when the assembly 120 is properly positioned in the tape-reading and image-projecting apparatus. In other words, the sound transcriber-projector unit is provided with an optical system as described for focusing projection light through the image frame of the circular array on disc 126 which is in the position of frame 41E′ when the assembly is positioned by hand in operative location therein for reproducing signals from the tape. The unit 115 containing spring-loaded pin P of FIG. 10 may be provided in a suitable location within housing 121 to project a round head pin through a hole in wall 122 to engage shallow cavities in the underside of disc 126 to serve the purpose described and prevent rotation of the disc unless urged by the indexing drive means. The hub 127 may also extend into the inwardly into the interior of the housing 121 so as not to protrude beyond the outer face of disc 126. The disc 126 may also be mounted flush with or beneath the outer face of wall 122 in a circular cavity or recess therein to provide the sidewall of the assembly substantially void of protrusions. In both the embodiments illustrated in FIGS. 9 to 12 the pins preferably extend beyond or within the coil winding of magnetic tape in the housing so as not to interfere with the tape travel although said pins may be integrally molded as protrusions from the walls 108 and 122. In FIGS. 9 and 10 the coil of magnetic tape extends around the circular cavity or recess in which the disc 110 is recessed. If the cavity 102C is shallow, say the depth of the thickness of the disc 110, the hub or post 111 may protrude into a cavity or opening in wall 102 and the housing 101 may be substantially dimensioned in thickness as the said commercially available tape cartridges.

In another embodiment, not illustrated, a record disc similar to discs 110 and 126 containing a circular array of image frames near the periphery thereof may rotationally support against the face thereof opposite the hub 11 or 127 a small magnetic tape cartridge of the type described. Said cartridge may then be properly positioned on a playback machine for transducing magnetically recorded signals from the tape thereof while the attached record disc is power rotated thereon as described above. In a further embodiment, the record disc 126 and tape cartridge 121 may be separately loadable on a playback machine, each in its own slot or other recepticle therefore with the disc being correctly manually positioned according to a mark or number as described which matches a corresponding number appearing on the tape at the scanning opening in the cartridge wall to provide synchronized image projection an audio playback as described.

I claim:

1. Apparatus for the audiovisual playback of stored information comprising in combination with a record disc made of an assembly of a plurality of components including:
- a first disc-shaped member having a centrally located opening;
- a second disc-shaped member assembled with and extending across said inner opening of said first disc-shaped member;
- one of said disc-shaped members having holding means integral therewith including retaining means overhanging the edge of the other disc member for slidably receiving the peripheral portion of said other disc member so as to retain said disc members together and arrangement to permit the independent rotation of said members;
- a spirally extending shaped groove provided in at least one surface of one of said disc members and containing undulations representing recorded audio information;
- a plurality of image frames arranged in a substantially circular array on one of said members;
- first means for rotationally supporting said first disc member;
- second means for rotationally supporting said second disc member;
- first power means for driving said disc member containing said spiral groove at a substantially constant speed;
- second power means for intermittently driving said disc member containing said circular array of image frames;
- means for operating said first and said second power means independently of each other;
- pickup tone arm means riding in the spiral recording groove of said assembly for playing back audio information, amplifying and transducing means coupled to said pickup means for transducing the information picked up thereby to sound;
- projection means including a light source for projecting light rays towards the image frame and registration with said projection means;
- control means for intermittently operating said second power means at predetermined times during the playback of information from said spiral groove whereby said image frames will be selectively power rotated and positioned in registration with said projection means while said first power means continuously rotates said disc member containing said spiral groove.

2. An audiovisual playback apparatus in accordance with claim 1, whereby said spiral grooving has a first plurality of predetermined sections thereof containing audio information associated with at least one of said image frames, and
- a second plurality of predetermined sections thereof interspersed among said first plurality of sections and containing undulations representing a predetermined constant frequency signal for indicating a request for an image frame change.

3. An audiovisual apparatus in accordance with claim 1, whereby said projection means further comprises a focusing lens and light-deflecting means for deflecting the light rays which have passed through said image frame in registry towards said focusing lens.

4. Audiovisual apparatus in accordance with claim 2, further comprising control means sensitive only to said predetermined constant frequency signals generated by playback of any of said second predetermined spiral groove sections, said control means being insensitive to signals outside of this frequency and operative for energizing said second power means for advancing said second power means for intermittently driving said second disc member independently of said first disc member.

5. An apparatus in accordance with claim 1, whereby said spiral groove has a first plurality of predetermined sections thereof containing audio information associated with at least one of said image frames and a second plurality of predetermined sections thereof interspersed among said first plurality of sections and containing undulations representing a control signal distinguishable from said audio information for indicating a request for image frame change.

6. Apparatus for the audiovisual playback of stored information comprising in combination:

an assembly of two record disc disposed concentrically relative to one another;

means for rotatably supporting one of said discs on the other;

a first of said record discs containing a spirally extending record groove having audio recordings in the form of undulations formed in the walls of said groove;

the other record disc containing a plurality of frames of projectable image information;

means for rotatably supporting said assembly;

first power means for driving said first record disc containing said spiral record groove at a substantially constant speed;

second power means for intermittently driving said disc containing said plurality of frames of image information;

means for operating said first and second power means independently of each other;

pickup tone arm means riding in the spiral groove of said first record disc and playing back audio information;

amplifying and transducing means coupled to said pickup means for transducing the information picked up thereby to sound;

projection means including a light source for projecting light towards the image frame in registration with said projection means, and control means for intermittently operating said second power means at predetermined times during the playback of information from said spiral groove whereby said record disc containing said frames will be selectively power rotated and the frames thereof will be positioned in registration with said projection means while said first power means independently and continuously rotates said first record disc containing said spiral groove.